United States Patent
Kim et al.

(10) Patent No.: US 11,182,088 B2
(45) Date of Patent: Nov. 23, 2021

(54) OPERATION METHOD OF A CONTROLLER

(71) Applicant: SK hynix Inc., Gyeonggi-do (KR)

(72) Inventors: Ki-Sung Kim, Gyeonggi-do (KR); Yong-Sang Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/710,029

(22) Filed: Dec. 11, 2019

(65) Prior Publication Data

US 2020/0363968 A1 Nov. 19, 2020

(30) Foreign Application Priority Data

May 15, 2019 (KR) .................. 10-2019-0056874

(51) Int. Cl.
*G06F 3/06* (2006.01)
*G06F 11/10* (2006.01)

(52) U.S. Cl.
CPC ............ *G06F 3/0634* (2013.01); *G06F 3/064* (2013.01); *G06F 3/0608* (2013.01); *G06F 3/0652* (2013.01); *G06F 3/0673* (2013.01); *G06F 11/1068* (2013.01)

(58) Field of Classification Search
CPC ........ G06F 3/061; G06F 3/064; G06F 3/0632; G06F 3/0608; G06F 3/0652; G06F 3/0673; G06F 3/0634; G06F 11/1048; G06F 11/1068
See application file for complete search history.

(56) References Cited

U.S. PATENT DOCUMENTS

| | | | | |
|---|---|---|---|---|
| 10,614,888 | B2* | 4/2020 | Igahara | G06F 3/061 |
| 2015/0286421 | A1* | 10/2015 | Chen | G06F 3/0632 |
| | | | | 714/764 |
| 2016/0268000 | A1* | 9/2016 | Thompson | G11C 11/5635 |
| 2020/0379643 | A1* | 12/2020 | Muthiah | G06F 3/0659 |
| 2021/0004169 | A1* | 1/2021 | Igahara | G06F 12/0253 |

FOREIGN PATENT DOCUMENTS

KR 10-2008-0100079 11/2008

OTHER PUBLICATIONS

Tseng et al., Understanding the impact of power loss on flash memories, Jun. 2011, IEEE, pp. 35 to 40.*

* cited by examiner

*Primary Examiner* — Shelly A Chase
(74) *Attorney, Agent, or Firm* — IP & T Group LLP

(57) ABSTRACT

A method for operating a controller which controls a memory device including a plurality of memory blocks operating in multi-level cell mode or a single level cell mode includes setting some of the plurality of memory blocks operating in the multi-level cell mode, to system memory blocks in response to a power-off request from a host, setting the system memory blocks to the single level cell mode, and controlling the memory device to store system data in the system memory blocks.

15 Claims, 8 Drawing Sheets

OPERATION METHOD OF A CONTROLLER

CROSS-REFERENCE TO RELATED APPLICATION

This application claims priority under 35 U.S.C. § 119 to Korean Patent Application No. 10-2019-0056874 filed on May 15, 2019, which is incorporated herein by reference in its entirety.

BACKGROUND

1. Field

Various embodiments relate to a controller which controls a memory device.

2. Discussion of the Related Art

Recently, the paradigm for the computer environment has changed to ubiquitous computing in which computer systems can be used anytime and anywhere. Due to this fact, the use of portable electronic devices such as mobile phones, digital cameras, and notebook computers has rapidly increased. In general, such portable electronic devices use a memory system which uses a memory device, that is, a data storage device. The data storage device is used as a main memory device or an auxiliary memory device of the portable electronic devices.

A data storage device using a nonvolatile memory device provides advantages in that, since there is no mechanical driving part unlike a hard disk, stability and durability are excellent, an information access speed is high and power consumption is small. Data storage devices having such advantages include a universal serial bus (USB) memory device, memory cards having various interfaces, and a solid state drive (SSD).

SUMMARY

Various embodiments are directed to a controller capable of improving the performance of a memory system by sufficiently securing a marginal memory region of a memory device while maintaining the reliability of system data, and an operating method thereof.

In an embodiment, a method for operating a controller which controls a memory device including a plurality of memory blocks operating in a multi-level cell mode or a single level cell mode may include: setting some memory blocks of the plurality of memory blocks operating in the multi-level cell mode, to system memory blocks, in response to a power-off request from a host; setting the system memory blocks to the single level cell mode; and controlling the memory device to store system data in the system memory blocks.

In an embodiment, a method for operating a controller which controls a memory device including a plurality of memory blocks operating in a multi-level cell mode or a single level cell mode may include: loading system data from system memory blocks operating in the single level cell mode, when power supply is sensed; controlling the memory device to erase some of the system memory blocks among the system memory blocks; and setting a data storage mode of the eased system memory blocks to the multi-level cell mode.

In an embodiment, a memory system may include: a memory device including a plurality of memory blocks including a multi-level cell and at least of two single level cells; and a controller coupled to the plurality of memory blocks suitable for: storing system data in the single level cells; determining whether power is supplied; when the power is on, changing one of the single level cells to a new multi-level cell; when the power is off, changing the new multi-level cell to a new single level cell; and storing the system data in the new single level cell.

Some advantageous effects according to the embodiments of the disclosure are as follows.

According to the embodiments, a controller capable of improving the performance of a memory system by sufficiently securing a marginal memory region of a memory device while maintaining the reliability of system data, and an operating method thereof are provided.

Other unmentioned advantages may be clearly understood from the following description by those having ordinary skill in the technical field to which the disclosure pertains.

DETAILED DESCRIPTION

Figure 1:
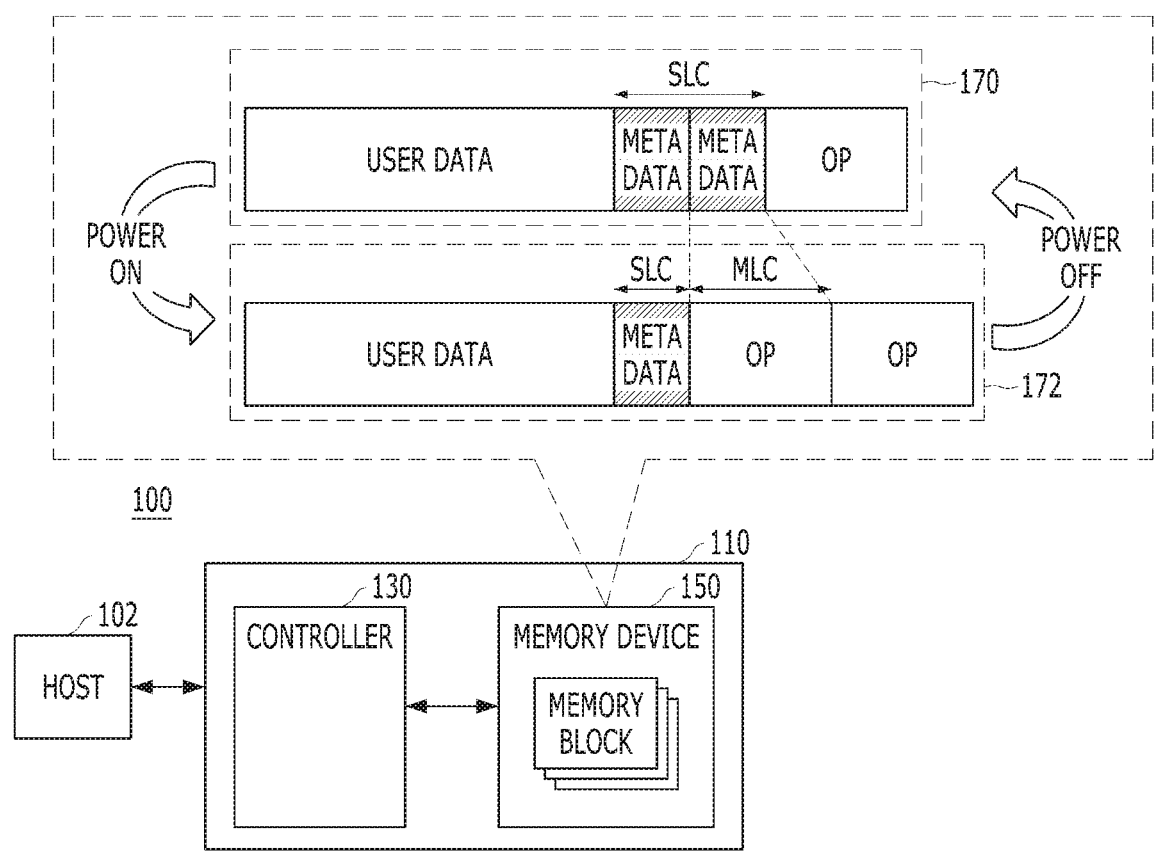
FIG. 1 is a block diagram illustrating a data processing system including a memory system in accordance with an embodiment.

Various embodiments will be described below in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a data processing system 100 including a memory system 110 in accordance with an embodiment. Referring to FIG. 1, the data processing system 00 may include a host 102 and a memory system 110.

The host 102 may include, for example, portable electronic devices such as a mobile phone, an MP3 player and a laptop computer or electronic devices such as a desktop computer, a game player, a television (TV) and a projector. The host 102 may include an application and a file system. The memory system 110 may be used as a main memory device or an auxiliary memory device of the host 102.

The memory system 110 may include a memory device 150 and a controller 130 which controls the memory device 150.

The memory device 150 may include a plurality of nonvolatile memory cells. The plurality of nonvolatile memory cells may have a string structure. A set of memory cells having a string structure is referred to as a cell array. A memory cell array of the memory device 150 may be configured by a plurality of memory blocks. Each memory block may be configured by a plurality of pages. Each page may be configured by a plurality of memory cells which share one word line.

The memory device 150 may include multi-level cell memory blocks capable of storing two or more-bit data in one memory cell. For example, the multi-level cell memory block may include a triple level cell memory block capable of storing three-bit data in one memory cell or a quadruple level cell memory block capable of storing four-bit data in one memory cell.

The mufti-level cell memory block may store a larger amount of data in the same area than a single level cell memory block. However, the multi-level cell memory block may have lower reliability of stored data than the single level cell memory block capable of storing one-bit data in one memory cell. The memory device 150 including the multi-level cell memory blocks may operate in various data storage modes. For example, the memory device 150 may program data requiring high reliability in a single level cell (SLC) mode and program large capacity data in a multi-level cell (MLC) mode, in response to the control of the controller 130.

The memory device 150 may perform an erase operation by the unit of memory block, and may perform read and write operations by the unit of page. The memory device 150 does not support an overwrite operation.

In order to complement the characteristics of the memory device 150 in which the unit of read and write operations and the unit of an erase operation are different, and which does not support an overwrite operation, the controller 130 may perform an operation for efficiently managing the storage space of the memory device 150. For example, the controller 130 may perform mapping between a logical address used in the file system of the host 102 and a physical address used in the memory device 150. For another example, the controller 130 may perform a garbage collection operation of collecting fragmented data of the memory device 150.

The memory device 150 may store not only user data according to a request from the host 102 but also system data. For example, the system data may include controller data for driving the memory system 110 and host data for driving the host 102. The controller data may include map data indicating the mapping relationship between logical addresses of the host 102 and physical addresses of the memory device 150, and memory block data for managing the respective memory blocks of the memory device 150. The host data may include a bootloader and an operating system (OS).

The memory device 150 may include a user region which stores user data, a system region which stores system data, and an overprovisioning (OP) region. The overprovisioning region is a marginal space for smoothly performing a background operation such as a garbage collection operation.

If system data is incorrectly read, the data processing system 100 may cause the controller 130 to access unintended data or an error may occur in a booting operation of the memory system 110 or the host 102. Therefore, the memory system 110 needs to ensure high reliability of system data.

The controller 130 may program system data in at least one memory block or memory cell of the memory device 150 in the single level cell (SLC) mode to ensure the reliability of the system data. The controller 130 may program at least two copies of system data in a memory block in the single level cell mode to further ensure the reliability of the system data. In order to program at least two copies of system data, a large system region may be needed. Since the size of the entire memory region of the memory device 150 is limited, the size of the overprovisioning (OP) region which may be provided by the memory device 150 providing the large system region may be limited. If the size of the overprovisioning (OP) region of the memory device 150 is limited, the controller 130 may not smoothly perform a background operation. Thus, the memory system 110 including the memory device 150 which stores at least two copies of system data in a memory block in the single level cell (SLC) mode may have difficulty providing a user with sufficient performance.

After data is programmed in the memory device 150, charges of memory cells corresponding to the program data may be lost as time elapses, and thereby, the data stored in the memory device 150 may be distorted. The memory system 110 may perform a read reclaim operation or a media scan operation in a power-on state to maintain the reliability of data stored in the memory device 150. However, the memory system 110 cannot perform an operation for maintaining the reliability of data stored in the memory device 150, in a power-off state. Therefore, the memory system 110 including the memory device 150 which stores only one copy of system data may have difficulty to ensuring reliability.

According to the embodiment of the disclosure, the memory system 110 may store at least two copies of system data in a memory block in the single level cell (SLC) mode in response to a power-off signal. For example, FIG. 1 illustrates a total capacity 170 of the memory device 150 when two copies of system data are stored in a memory block in the single level cell (SLC) mode.

The memory system 110 may erase memory blocks which store some pieces of system data of the at least two copies of system data, when being powered on. The memory system 110 may change the erased memory blocks into an overprovisioning (OP) region. The memory system 110 may store data in the overprovisioning region in the multi-level cell (MLC) mode to smoothly perform a background operation. For example, FIG. 1 illustrates a total capacity 172 of the memory device 150 in which memory blocks storing one copy of system data are changed into blocks of an overprovisioning (OP) region. When memory blocks which are used in the single level cell mode are used in the multi-level cell mode, since a larger amount of data may be stored in the same memory blocks, the size of an overprovisioning region of the memory device 150 may increase.

According to the embodiment of the disclosure, the reliability of the system data may be enhanced by storing at least two copies of system data in a power-off state in which the memory system 110 does not need to maintain performance and has difficulty maintaining the reliability of data stored in the memory device 150. On the other hand, by securing a sufficient overprovisioning region in a power-on state in which the reliability of data stored in the memory device 150 may be maintained, high performance may be provided to a user.

Figure 2:
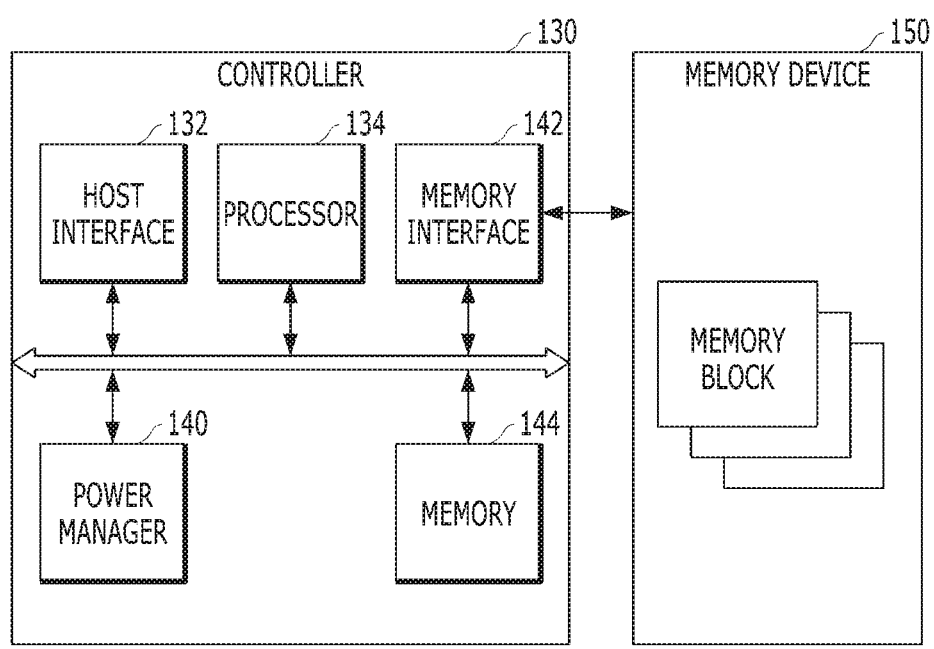
FIG. 2 is a block diagram illustrating a memory system in accordance with the embodiment.

FIG. 2 is a block diagram illustrating the memory system 110 in accordance with the embodiment.

As described above with reference to FIG. 1, the memory system 110 may include the controller 130 and the memory device 150. The controller 130 may include a host interface 132, a processor 134, a power manager 140, a memory interface 142 and a memory 144 which interoperate with one another.

The host interface 132 processes a command and data of the host 102. The host interface 132 may be configured to communicate with the host 102 through at least one of various interface protocols such as universal serial bus (USB), multimedia card (MMC), peripheral component interconnect-express (PCI-e or PCIe), serial attached SCSI (SAS), serial advanced technology attachment (SATA), parallel advanced technology attachment (DATA), small computer system interface (SCSI), enhanced small disk interface (ESDI), integrated drive electronics (IDE) and mobile industry processor interface (MIPI).

The memory interface 142 may function as a memory/storage interface for interfacing between the controller 130 and the memory device 150, to allow the controller 130 to control the memory device 150 in response to a request from the host 102. When the memory device 150 is a flash memory (e.g., a NAND flash memory), the memory interface 142 may generate a control signal for the memory device 150, and may process data to be provided to the memory device 150, under the control of the processor 134. The memory interface 142 may operate as an interface for processing a command and data between the controller 130 and the memory device 150, for example, a NAND flash interface.

The memory 144 may function as a working memory of the memory system 110 and the controller 130, and may store data for driving the memory system 110 and the controller 130. For example, the memory 144 may store data necessary to perform data input/output operations between the host 102 and the memory device 150. Further, the memory 144 may store block management information including attribute information of respective memory blocks.

The power manager 140 may manage power supply to the memory system 110.

The processor 134 may control general operations of the memory system 110. For instance, the processor 134 may control general operations of the memory system 110 by driving a flash translation layer (FTL) which is realized by firmware and is loaded to the memory 144.

The processor 134 may perform a foreground operation according to a request from the host 102. The processor 134 may map a logical address associated with a request received from the host interface 132 and a physical address of the memory device 150. The processor 134 may translate a write request, a read request and an erase request into a program command, a read command and an erase command, respectively, for the memory device 150. In some embodiments, the processor 134 may provide write commands to the memory interface 142 by aligning the orders of the write commands, thereby maximizing the one shot program performance, one shot read performance, or parallel processing performance of the memory interface 142.

The processor 134 may also perform a background operation. For example, the processor 134 may perform garbage collection to allow the memory device 150 to have a sufficient number of empty blocks, thereby collecting valid data, migrating the valid data to empty blocks and erasing blocks storing the migrated valid data.

The processor 134 may divide the memory device 150 into a user region, a system region, and an overprovisioning region. For example, the processor 134 may divide the memory blocks of the memory device 150 into user blocks and system blocks. The processor 134 may store user data in the user blocks. In order to store system data, the processor 134 may use some of the memory blocks as system blocks, and may store the system data in the system blocks. The processor 134 may use the remaining memory blocks except for the system blocks, as overprovisioning blocks. The processor 134 may use the overprovisioning blocks to smoothly perform a background operation.

According to the embodiment of the disclosure, the processor 134 may control the memory device 150 to program the system blocks in the single level cell mode. The processor 134 may change some of the overprovisioning blocks into system blocks in response to a power-off signal, and may control the memory device 150 such that the corresponding system blocks are programmed in the single level cell mode. The processor 134 may copy system data stored in existing system blocks, and thereby, may store at least one copy of system data in the changed system blocks. When being powered on, the processor 134 may remove at least one copy of system data, may change system blocks in which the removed system data has been stored, into overprovisioning blocks, and may control the memory device 150 such that the corresponding overprovisioning blocks are programmed in the multi-level cell mode.

Figure 3A:
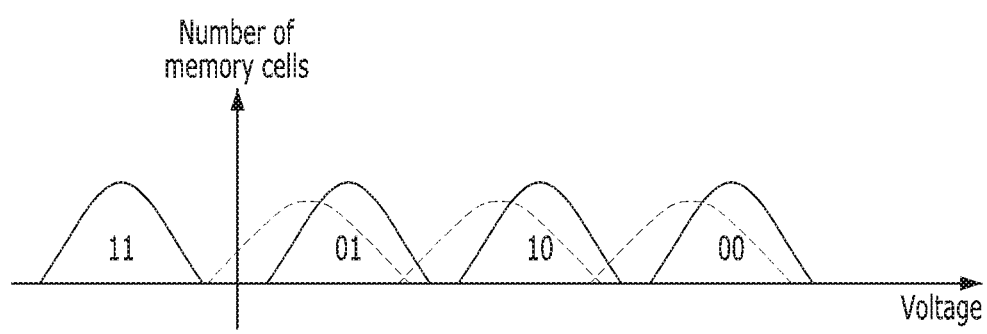
FIGS. 3A and 3B are diagrams illustrating examples of threshold voltage distributions of memory cells in a memory device.
Figure 3B:
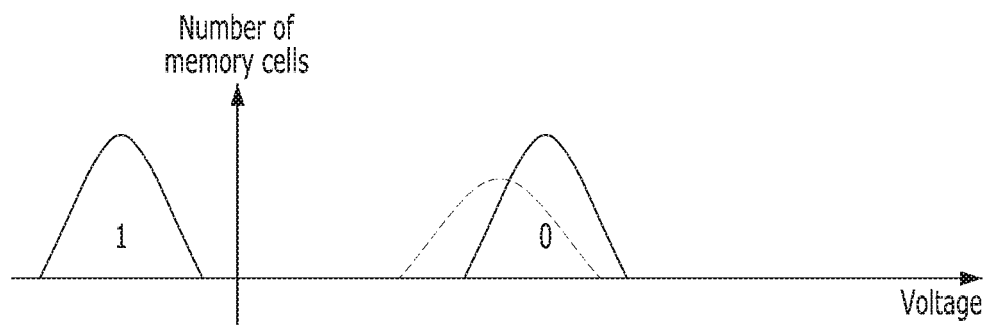

FIGS. 3A and 3B are diagrams illustrating examples of threshold is voltage distributions of memory cells in the memory device 150.

According to an embodiment, the memory device 150 may be a flash memory, for example, a nonvolatile memory such as a NAND flash memory. However, the memory device 150 may be realized by any one memory among memories such as a phase change memory (or a phase change random access memory (PCRAM)), a resistive memory (or a resistive random access memory (RRAM or ReRAM)), a ferroelectric memory (or a ferroelectric random access memory (FRAM)) and a spin transfer torque magnetic memory (or a spin transfer torque magnetic random access memory (STT-RAM or STT-MRAM)). The memory device 150 may include a plurality of memory blocks including multi-level cell memory blocks capable of storing two or more-bit data in one memory cell. A multi-level cell may be programmed in a multi-level cell mode or a single level cell mode. A multi-level cell which is programmed in the multi-level cell mode may store two or more-bit data. A multi-level cell which is programmed in the single level cell mode may store one-bit data.

FIG. 3A is a graph illustrating threshold voltage distributions of multi-level cells which are programmed in the multi-level cell mode.

In the graph of FIG. 3A, the horizontal axis represents a threshold voltage, and the vertical axis represents the number of memory cells having a corresponding threshold voltage.

Referring to FIG. 3A, memory cells may be programmed in the multi-level cell mode to have any one among four states 11, 01, 10 and 00 depending on a threshold voltage distribution. For example, memory cells which have the '11' state being an erase state may be first-programmed to have the '11' state or the '10' state. Among the first-programmed memory cells, memory cells having the '11' state may be second-programmed to have the '11' state or the '01' state, and memory cells having the '10' state may be third-programmed to have the '10' state or the '00' state. The threshold voltage distributions illustrated by the solid lines in FIG. 3A represent threshold voltage distributions when the memory cells are ideally programmed.

FIG. 3B is a graph illustrating threshold voltage distributions of single level cells which are programmed in the single level cell mode.

In the graph of FIG. 3B, the horizontal axis represents a threshold voltage, and the vertical axis represents the number of memory cells having a corresponding threshold voltage.

Referring to FIG. 3B, memory cells may be programmed in the single level cell mode to have one of two states 1 and 0 depending on a threshold voltage distribution. For example, memory cells which have the '1' state being an erase state may be programmed to have the '1' state or the '0' state. The threshold voltage distributions illustrated by the solid lines in FIG. 3B represent threshold voltage distributions when the memory cells are ideally programmed.

When memory cells are programmed in the multi-level cell mode, a storage capacity per area of a memory chip may increase. However, a memory cell which is programmed in the multi-level cell mode has a high probability that an error may occur, when compared to a memory cell which is programmed in the single level cell mode. The threshold voltage distributions illustrated by the dotted lines in FIGS. 3A and 3B represent threshold voltage distributions that are changed after memory cells are programmed. Memory cells which are programmed in the multi-level cell mode have narrow threshold voltage intervals between respective states, thus, even when a threshold voltage distribution is slightly changed when a corresponding memory cell is read, the likelihood for the corresponding memory cell to be read as another threshold voltage distribution is high.

In the embodiment, the controller 130 may program user data in the mufti-level cell mode to sufficiently secure the storage capacity of the memory device 150, and may program system data in the single level cell mode to ensure the highly reliable operation of the memory device 150.

Figure 4:
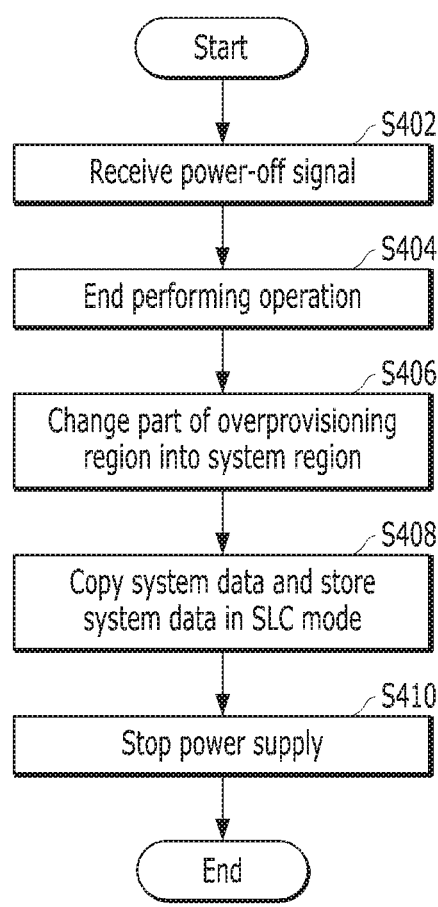
FIGS. 4 and 5 are flow charts illustrating operations of a memory system in accordance with the embodiment.

FIG. 4 is a flow chart illustrating the operation of the memory system 110 in accordance with the embodiment.

Referring to FIG. 4, the host 102 may provide a power-off signal to the memory system 110 through the host interface 132. At step S402, the processor 134 may receive the power-off signal from the host interface 132.

At step S404, the processor 134 may end a currently performing operation in response to the power-off signal.

At step S406, the processor 134 may change some of overprovisioning blocks into system blocks. The processor 134 may store data in the system blocks in the single level cell mode.

At step S408, the processor 134 may copy at least one copy of system data to the changed system blocks. For example, the processor 134 may load system data stored in an existing system region of the memory device 150, to the memory 144. Further, the processor 134 may control the memory device 150 to program the loaded system data in the changed system blocks.

At step S410, the power manager 140 may stop power supply to the memory system 110.

According to the embodiment of the disclosure, the controller 130 may cause the memory device 150 to store at least two copies of system data which are programmed in the single level cell mode, in a power-off state. Since at least two copies of system data are stored in the single level cell mode, even when the charges stored in the memory cells of the memory device 150 are somewhat lost, system data may be successfully recovered by referring to the at least two copies of system data. Therefore, the reliability of the memory system 110 may be maintained.

Figure 5:
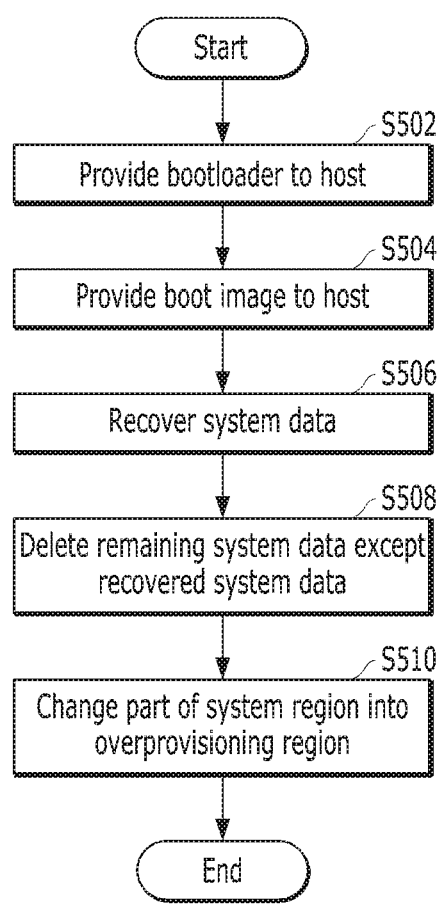

FIG. 5 is a flow chart illustrating the operation of the memory system 110 in accordance with the embodiment.

FIG. 5 illustrates an initial operation that may be performed in the memory system 110 when power is supplied to the memory system 110. The operation of the memory system 110 illustrated in FIG. 5 is a mere example, and may be changed depending on whether the memory system 110 is mounted in a mobile device or a computing device such as a notebook or a desktop.

As the power manager 140 senses power supply, at step S502, the host interface 132 may provide a bootloader stored in the memory device 150, in response to a request of the host 102. The bootloader which is firmware may be loaded to a memory of the host 102 and be driven by a processor of the host 102.

The host 102 may check whether a platform is initialized, according to an instruction of the bootloader, to boot an operating system (OS). The host 102 may request a boot image to the memory system 110 according to an instruction of the bootloader.

At step S504, the host interface 132 may transfer the boot image stored in the memory device 150, to the host 102, in response to the request of the host 102. The boot image may include data for allowing the host 102 to execute the operating system or an application program.

The host 102 may execute the boot image according to an instruction of the bootloader, and thereby, may complete booting of the operating system. If the booting is completed, the bootloader may transfer control of the data processing system 100 to the operating system.

At step S506, the processor 134 may recover system data based on the at least two copies of system data stored in a memory block of the memory device 150 in the single level cell mode. For example, the processor 134 may sequentially load one copy of system data to the memory 144. If an error is detected in at least a portion of the one copy of system data, the processor 134 may recover system data by replacing the portion where the error is detected, with a portion of another copy of system data. The recovered system data may be reflected on the one copy of system data. The processor 134 may operate the memory system 110 based on the recovered system data. For example, the processor 134 may recover a map table based on the recovered system data.

At step S508, the processor 134 may erase (or delete) memory blocks which store system data except the one copy of system data recovered out of the at least two copies of system data.

At step S510, the processor 134 may change the memory blocks from system blocks into overprovisioning blocks. The processor 134 may access the changed overprovisioning blocks in the multi-level cell mode.

According to the embodiment of the disclosure, the controller 130 may remove at least one copy of system data which is programmed in a memory block in the single level cell mode, when being powered on, and may use a memory region in which the removed system data is stored, as an overprovisioning region. The processor 134 may smoothly perform a background operation by using an overprovisioning region which is increased.

According to an embodiment, the controller 130 may perform a read reclaim operation of moving and storing system data from a system block to another system block, when a read count of the system block exceeds a predetermined count.

Also, according to an embodiment, the controller 130 may perform a media scan operation of detecting an error by reading system data at a predetermined period in a power-on state, correcting an error of system data in which the number of error bits is greater than or equal to a threshold, and storing the error-corrected system data in a system block. For instance, the threshold may be determined as a number less than a maximum number of error bits correctable by error correction decoding. If the number of error bits of system data exceeds the maximum number of error bits, the controller 130 may perform a read retry, thereby recovering system data and storing recovered system data in a system block.

In the power-on state, when the controller 130 performs the read reclaim or media scan operation, the reliability of one copy of system data which is not removed may be maintained, and a memory region in which removed system data is stored may be used as an overprovisioning region, whereby the performance of the memory system 110 may be improved.

Figure 6:
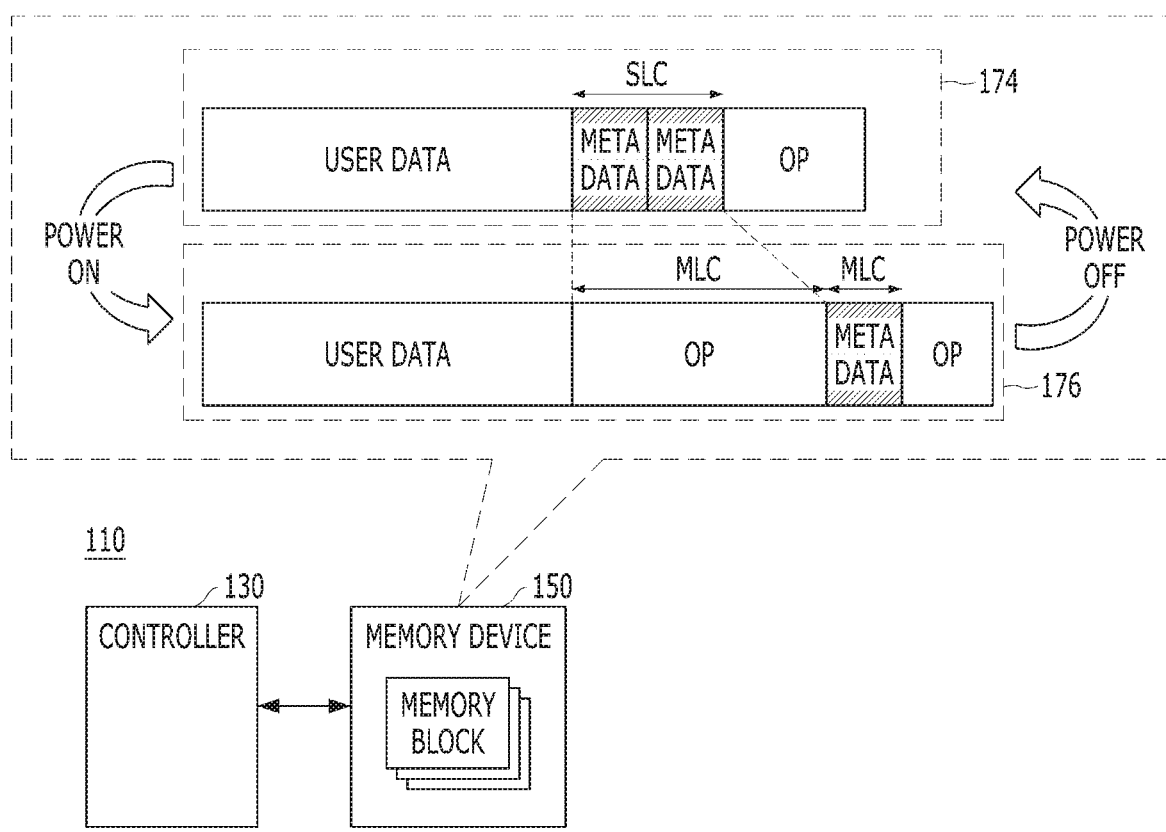
FIG. 6 is a diagram illustrating a memory system in accordance with an embodiment.

FIG. 6 is a diagram illustrating a memory system 110 in accordance with an embodiment.

The memory system 110 illustrated in FIG. 6 may include components corresponding to those of the memory system 110 described above with reference to FIG. 1. The memory system 110 illustrated in FIG. 6 may include a memory device 150 and a controller 130 which controls the memory device 150.

The memory system 110 may store at least two copies of system data in a memory block in a single level cell mode in a power-off state. FIG. 6 illustrates a total capacity 174 of the memory device 150 when two copies of system data are stored in a memory block in the single level cell mode.

According to the embodiment of the disclosure, the memory system 110 may load system data to the controller 130 from the memory device 150 when being powered on, and may store one copy of system data in the memory device 150 in a memory block in a multi-level cell mode. The memory system 110 may delete the at least two copies of the system data which are stored in a memory block in the single level cell mode. The memory system 110 may change a memory region which stores the system data in the single level cell mode, into an overprovisioning region, and may access the overprovisioning region in the multi-level cell mode. FIG. 6 illustrates a total capacity 176 of the memory device 150 when one copy of system data is stored in the multi-level cell mode and memory blocks which store the at least two copies of system data are changed into overprovisioning blocks. The controller 130 may use the memory blocks which are used in the single level cell mode, to the multi-level cell mode, thereby increasing the size of the overprovisioning region of the memory device 150. The memory system 110 may improve the performance of a background operation using the increased overprovisioning region.

Figure 7:
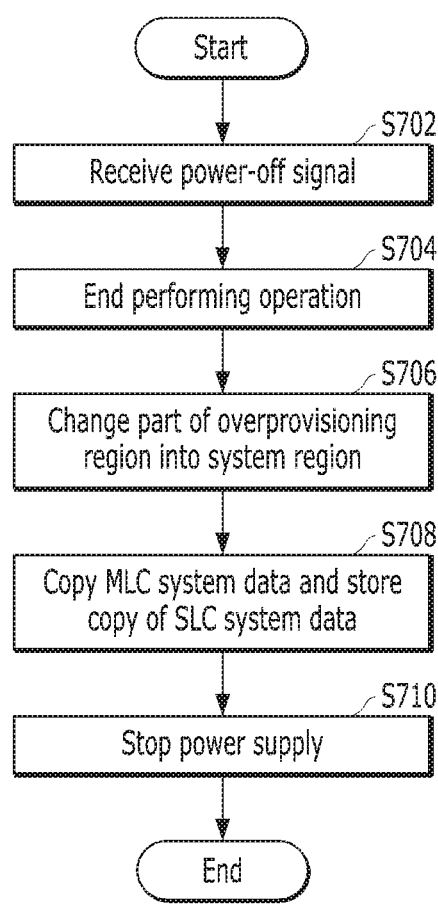
FIGS. 7 and 8 are flow charts illustrating operations of a memory system in accordance with the embodiment.

FIG. 7 is a flow chart illustrating the operation of the memory system 110 in accordance with the embodiment.

Referring to FIG. 7, at step S702, the host interface 132 may receive a power-off signal from the host 102.

At step S704, the processor 134 may end a currently performing operation in response to the power-off signal.

At step S706, the processor 134 may change a part of an overprovisioning region into a system region. The processor 134 may store data in the system region in a memory block in the single level cell mode.

At step S708, the processor 134 may copy at least two copies of system data to the changed system region. For example, the processor 134 may load system data stored in an existing system region of the memory device 150 in the multi-level cell mode, to the memory 144. Further, the processor 134 may control the memory device 150 to program the system data which is loaded in the memory 144, into the changed system region at least two times.

At step S710, the power manager 140 may stop power supply to the memory system 110.

According to the embodiment of the disclosure, the controller 130 may cause the memory device 150 to store at least two copies of system data programmed in the single level cell mode, in a power-off state, thereby stably storing system data in the memory device 150.

Figure 8:
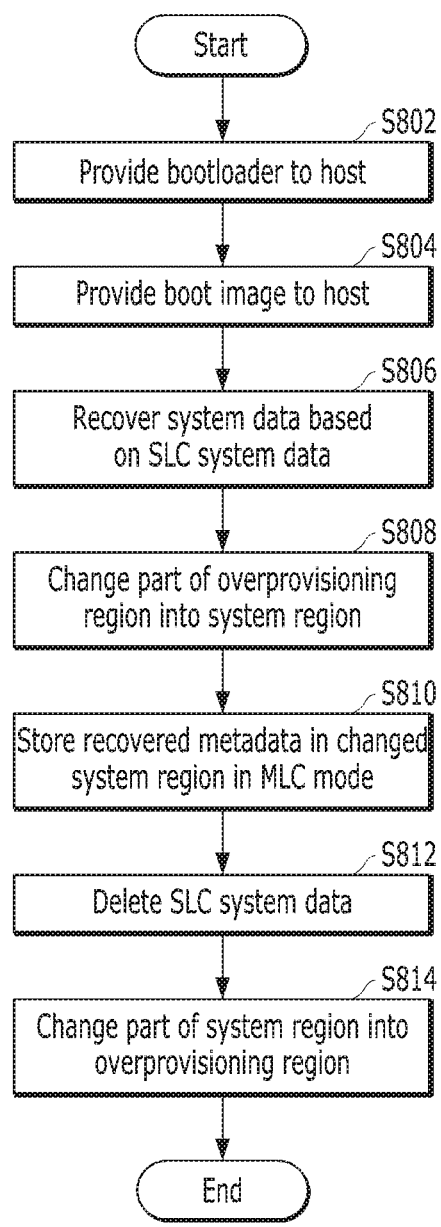

FIG. 8 is a flow chart illustrating the operation of the memory system 110 in accordance with the embodiment.

When the power manager 140 senses power supply, at step S802, the host interface 132 may provide a bootloader stored in the memory device 150, in response to a request of the host 102.

At step S804, the host interface 132 may transfer a boot image stored in the memory device 150, to the host 102, in response to a request of the host 102.

The host 102 may execute the boot image according to an instruction of the bootloader, and thereby, may complete booting of an operating system. When the booting is completed, the bootloader may transfer control of the data processing system 100 to the operating system.

At step S806, the processor 134 may recover system data based on the at least two copies of system data stored in the memory device 150 in the single level cell mode. The processor 134 may operate the memory system 110 based on the recovered system data.

At step S808, the processor 134 may change a part of an overprovisioning region into a system region. The processor 134 may store data in the changed system region in the multi-level cell mode.

At step S810, the processor 134 may control the memory device 150 to program the recovered system data in the changed system region in the multi-level cell mode.

At step S812, the processor 134 may delete the at least two copies of the system data which are stored in the system region in the single level cell mode.

At step S814, the processor 134 may change memory blocks in which the deleted at least two copies of system data are stored, into an overprovisioning region. The processor 134 may access the changed overprovisioning region in the multi-level cell mode. The processor 134 may smoothly perform a background operation using the overprovisioning region which is increased.

According to the embodiment of the disclosure, the controller 130 may remove at least two copies of system data which are programmed in the single level cell mode, when being powered on, and may use a memory region in which the copies of system data are stored, as an overprovisioning region.

According to an embodiment, the controller 130 may perform a media scan operation for system data stored in the multi-level cell mode, at a predetermined period, and perform a read reclaim operation for memory blocks of a system region, thereby maintaining the reliability of the system data.

Although various embodiments have been described for illustrative purposes, it will be apparent to those skilled in the art that various changes and modifications may be made without departing from the spirit and scope of the invention as defined in the following claims.

What is claimed is:

1. A method for operating a controller which controls a memory device including a plurality of memory blocks operating in a multi-level cell mode or a single level cell mode, the method comprising:

setting some memory blocks of some overprovisioning memory blocks among the plurality of memory blocks operating in the multi-level cell mode, to system memory blocks, in response to a power-off request from a host;

setting the system memory blocks to the single level cell mode; and controlling the memory device to store system data in the system memory blocks.

2. The method according to claim 1, further comprising:

loading the system data from the system memory blocks to the controller when power supply is sensed;

controlling the memory device to erase the some system memory blocks among the system memory blocks;

setting the erased system memory blocks to new overprovisioning memory blocks; and setting the new overprovisioning memory blocks to the multi-level cell mode.

3. The method according to claim 2, wherein the controlling of the memory device to store the system data comprises:

loading the system data from the memory device, and copying the loaded system data to the system memory blocks.

4. The method according to claim 2, further comprising:

when a read count of a system memory block in which the system data is stored exceeds a set count, moving the system data to another system memory block other than the system memory block in which the system data is stored and storing the moved system data.

5. The method according to claim 2, further comprising:

detecting an error by reading the system data at a set period, correcting the error when the number of error bits is greater than or equal to a threshold, and storing the error-corrected system data again in the system memory blocks.

6. The method according to claim 2, further comprising:

performing a garbage collection operation using the overprovisioning memory blocks.

7. The method according to claim 1, wherein the system data includes at least one among map data, data regarding memory blocks, data regarding a bootloader and data regarding an operating system.

8. A method for operating a controller which controls a memory device including a plurality of memory blocks operating in a multi-level cell mode or a single level cell mode, the method comprising:

loading system data from system memory blocks operating in a single level cell mode, when power supply is sensed;

controlling the memory device to erase some of the system memory blocks among the system memory blocks; and setting a data storage mode of the erased system memory blocks to overprovisioning memory blocks operating in multi-level cell mode.

9. The method according to claim 8, further comprising:

setting some memory blocks among overprovisioning memory blocks to new system memory blocks in response to a power-off request of a host;

setting the new system memory blocks to the single level cell mode; and controlling the memory device to store the system data in the new system memory blocks.

10. The method according to claim 9, wherein the controlling of the memory device to store the system data in the new system memory blocks comprises:

loading the system data from the memory device, and copying the system data to the new system memory blocks.

11. The method according to claim 8, further comprising:

when a read count of a system memory block exceeds a set count, moving system data of the system memory block to another system memory block, and storing the moved system data.

12. The method according to claim 8, further comprising:

detecting an error by reading the system data at a set period, correcting the error when the number of error bits is greater than or equal to a threshold, and storing the error-corrected system data in the system memory blocks.

13. The method according to claim 8, wherein the system data includes at least one among map data, data regarding memory blocks, data regarding a bootloader and data regarding an operating system.

14. The method according to claim 8, further comprising:

performing a garbage collection operation using the overprovisioning memory blocks.

15. A memory system comprising:

a memory device including a plurality of memory blocks including a multi-level cell and at least two single level cells; and a controller coupled to the plurality of memory blocks, suitable for:

storing system data in the single level cells;

determining whether power is suppled;

when the power is on, changing one of the single level cells to a new multi-level cell;

when the power is off, changing the new multi-level cell to a new single level cell; and storing the system data in the new single level cell.

* * * * *